United States Patent [19]
Nonaka

[11] Patent Number: 5,915,233
[45] Date of Patent: Jun. 22, 1999

[54] DISTANCE MEASURING APPARATUS

[75] Inventor: Osamu Nonaka, Sagamihara, Japan

[73] Assignee: Olympus Optical Co., Ltd., Tokyo, Japan

[21] Appl. No.: 08/865,205

[22] Filed: May 29, 1997

[30] Foreign Application Priority Data

Jun. 4, 1996 [JP] Japan ................................. 8-141753

[51] Int. Cl.⁶ ................................. G01C 3/00; G01C 3/02
[52] U.S. Cl. ........................... 702/158; 702/159; 396/70; 396/89; 396/121; 356/3
[58] Field of Search ............................... 364/561; 396/65, 396/89, 121, 106, 104, 67, 70; 250/201.6, 201.4; 356/3, 3.01, 3.04, 3.06, 3.02, 3.08; 702/158, 159

[56] References Cited

U.S. PATENT DOCUMENTS

| | | |
|---|---|---|
| 4,257,705 | 3/1981 | Hosoe et al. . |
| 4,357,083 | 11/1982 | Johnson et al. . |
| 4,592,638 | 6/1986 | Kaneda et al. . |
| 5,589,910 | 12/1996 | Saito et al. ............................... 396/106 |
| 5,652,926 | 7/1997 | Saito ........................................... 396/97 |
| 5,655,160 | 8/1997 | Saito ......................................... 396/106 |
| 5,680,648 | 10/1997 | Nonaka ................................... 396/109 |
| 5,737,645 | 4/1998 | Saito ........................................ 396/98 |

FOREIGN PATENT DOCUMENTS

| | | |
|---|---|---|
| 62-124408 | 6/1987 | Japan . |
| 62-204245 | 9/1987 | Japan . |

*Primary Examiner*—Patrick Assouad
*Attorney, Agent, or Firm*—Frishauf, Holtz, Goodman, Langer & Chick

[57] ABSTRACT

A light-projecting unit projects distance measurement light onto an object to be photographed. A light quantity detecting unit splits, from steady light, the reflected signal light quantity of the distance measurement light from the object on the basis of the light received by a sensor, and detects the reflected signal light quanity. A sensor array constituted by a pair of sensor arrays monitors the luminance distribution of light which steadily irradiates the object. Normally, a CPU calculates the distance to the object on the basis of the luminance distribution output from the sensor array. When the object has a low luminance or contrast, the CPU calculates the distance to the object on the basis of the reflected signal light quantity received by the sensor.

31 Claims, 11 Drawing Sheets

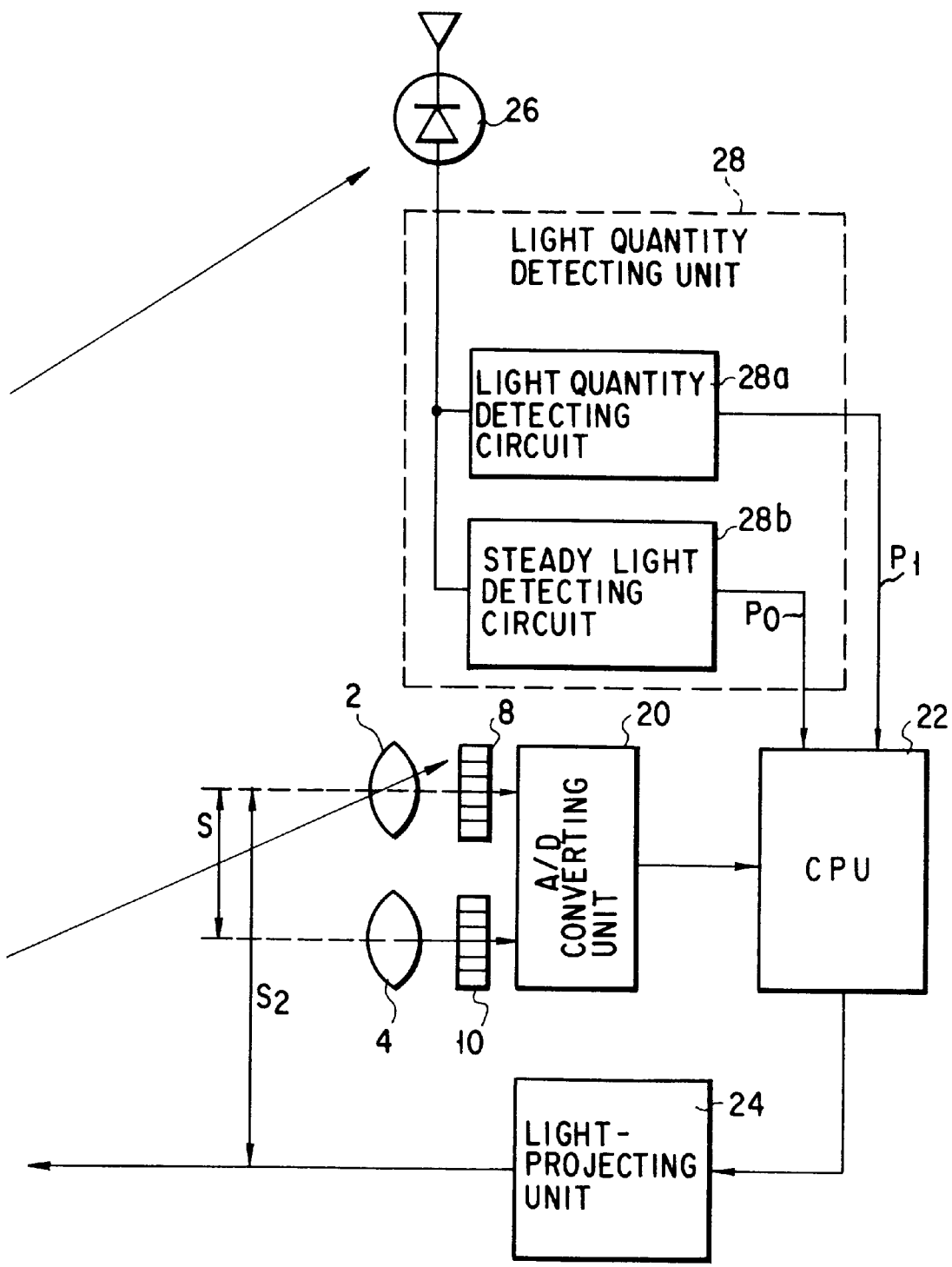
F I G. 1

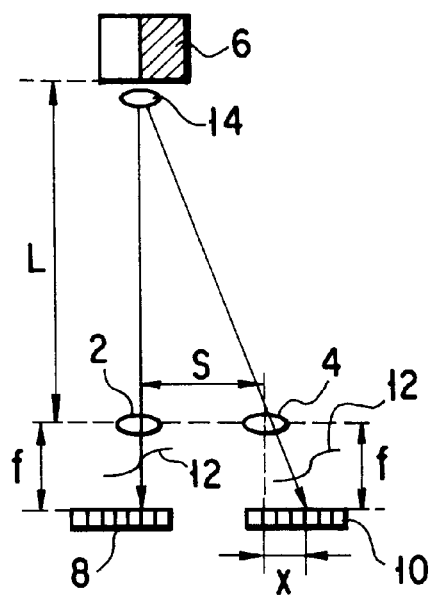
F I G. 2A
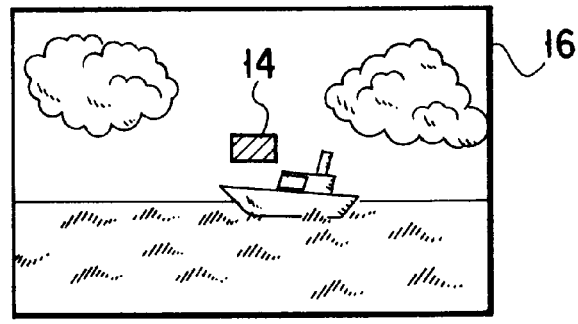
F I G. 2B
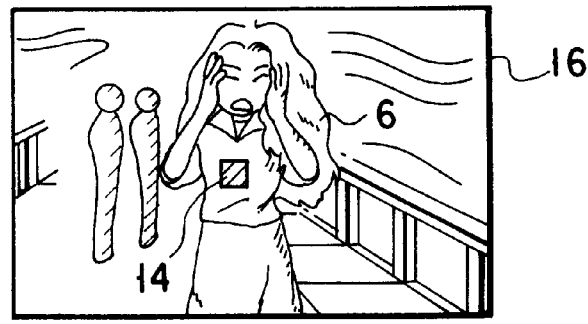
F I G. 2C

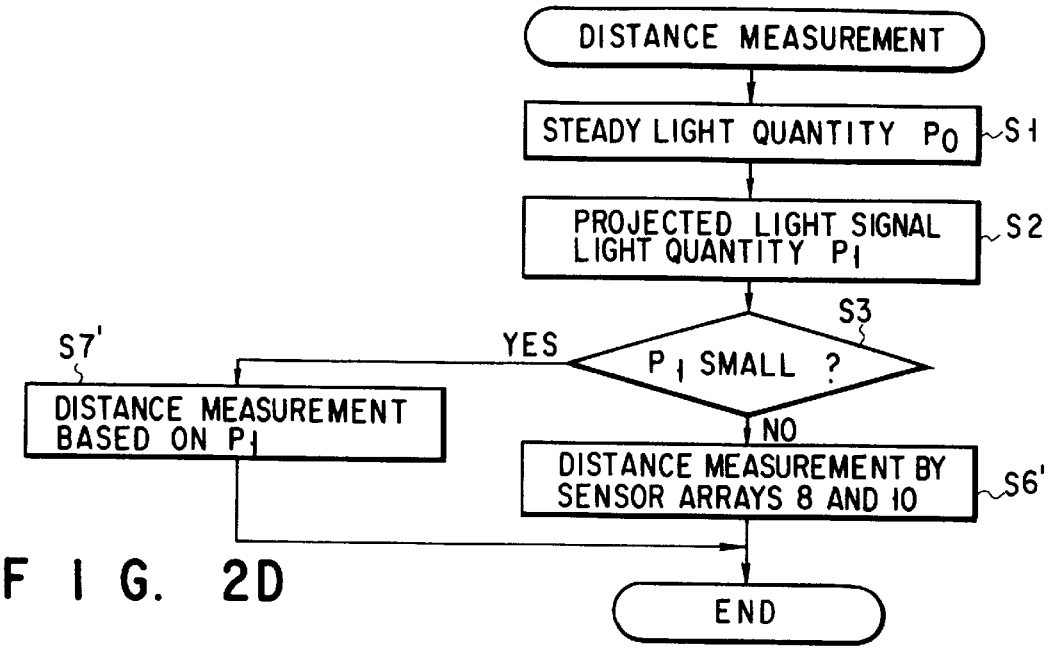
F I G. 2D
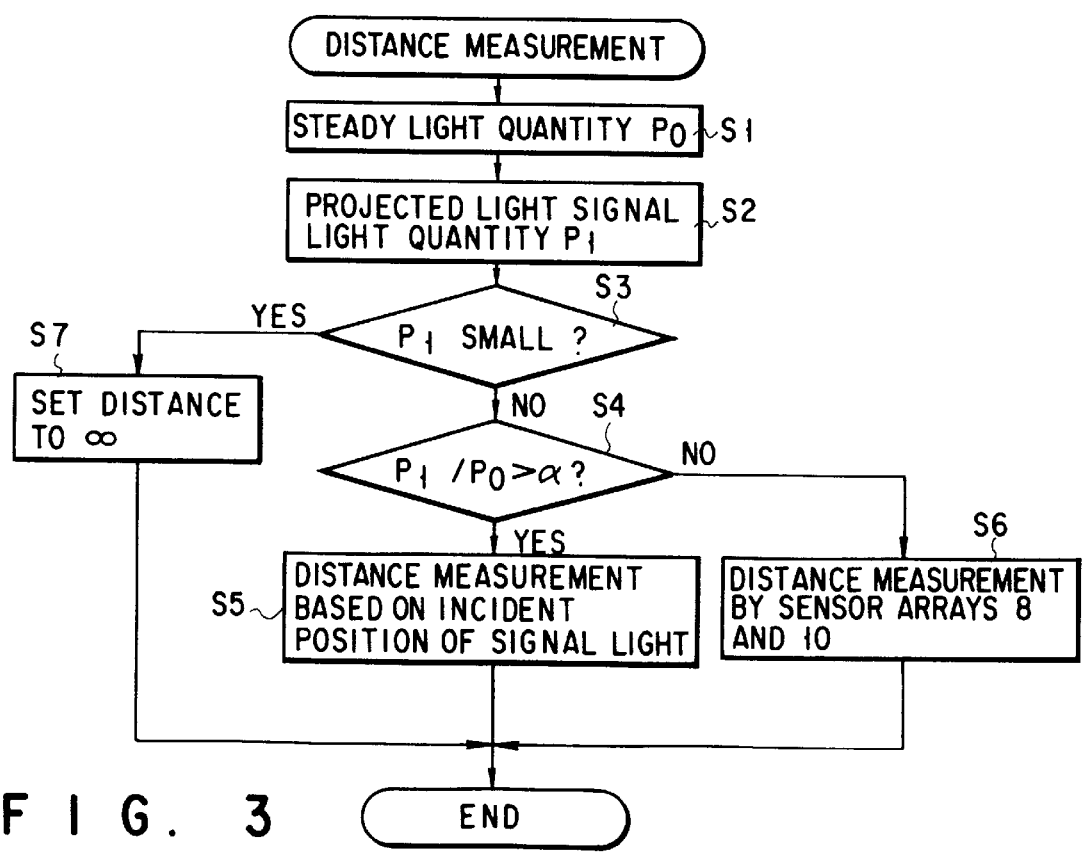
F I G. 3

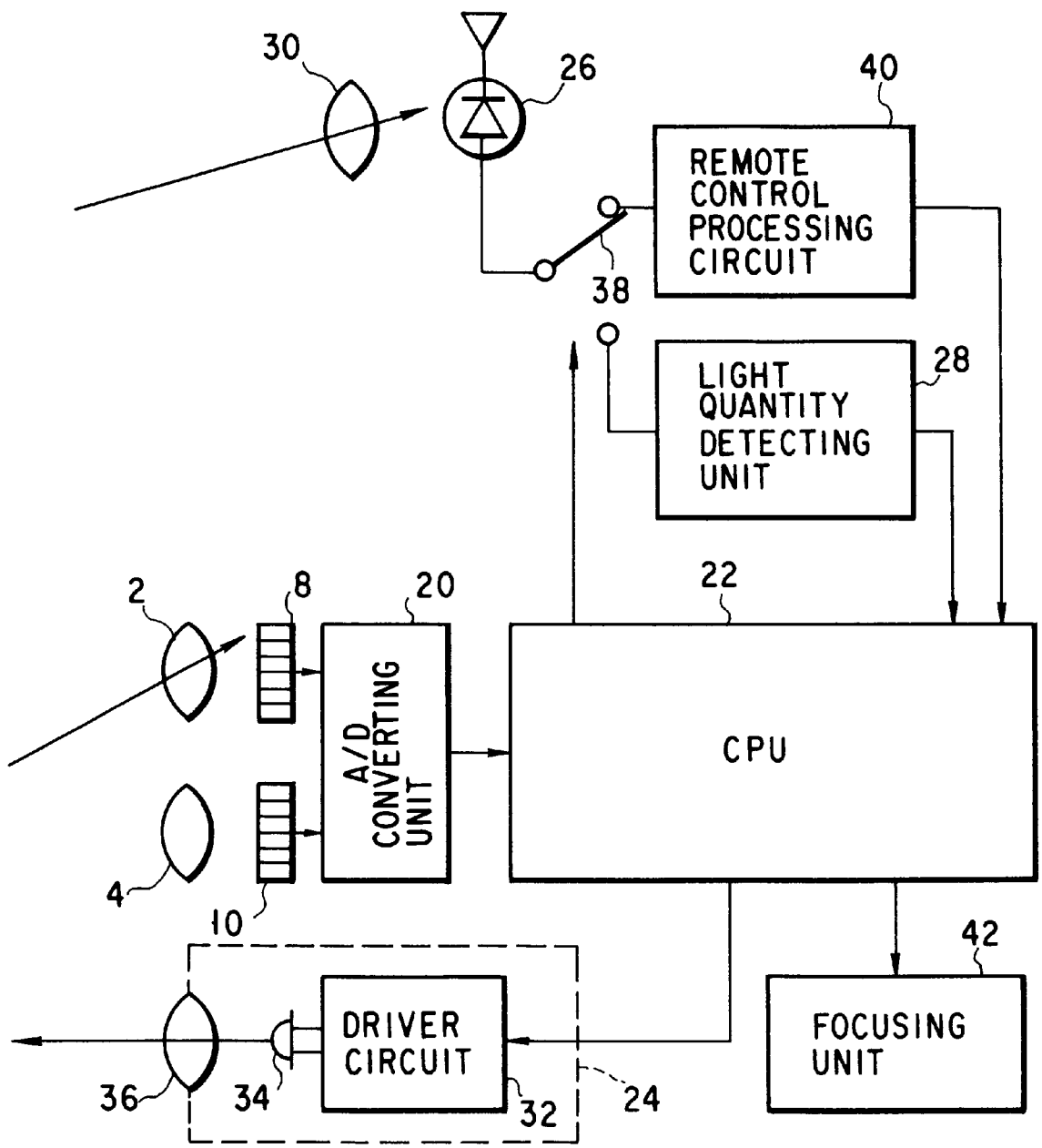
F I G. 4

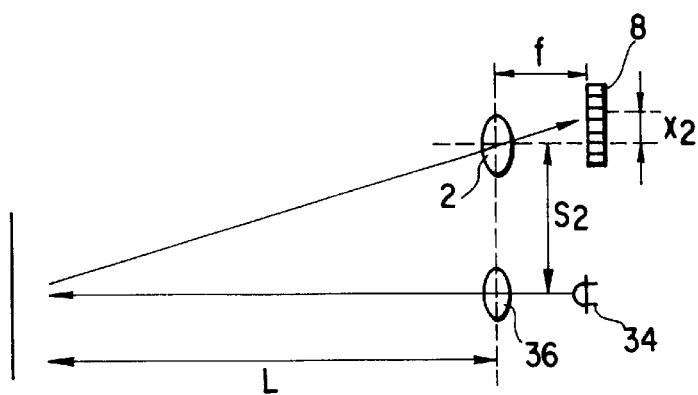
F I G. 5A
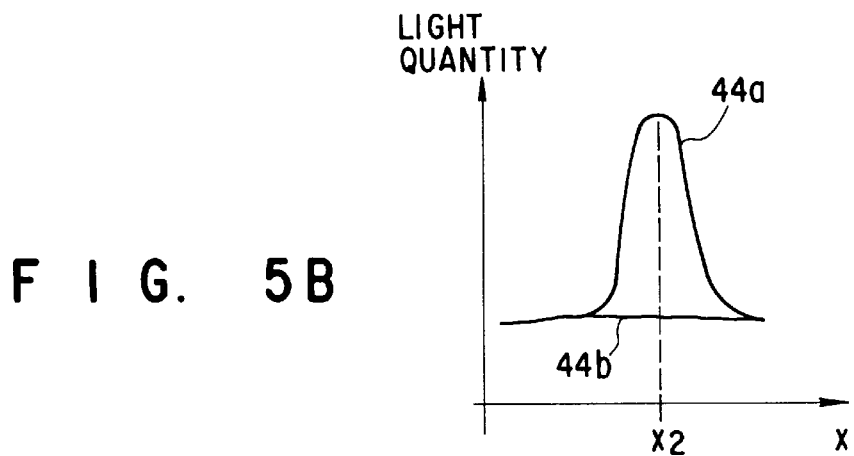
F I G. 5B
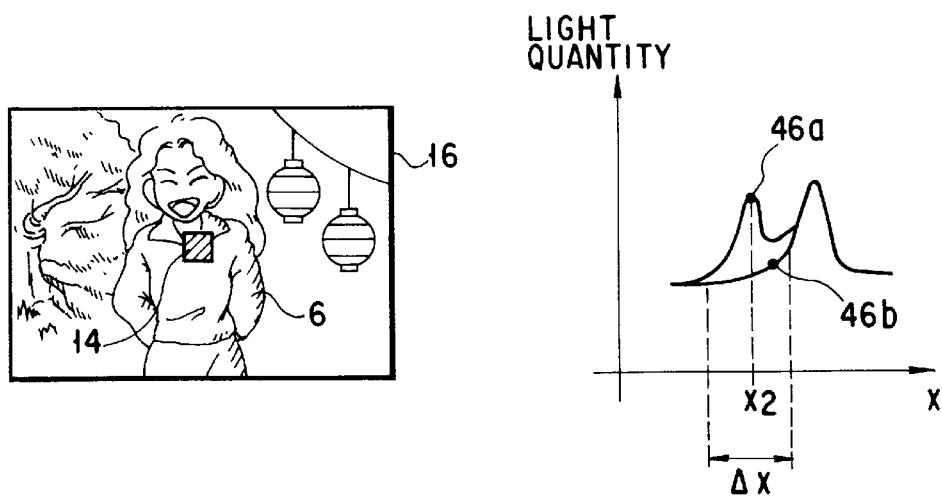
F I G. 6A   F I G. 6B

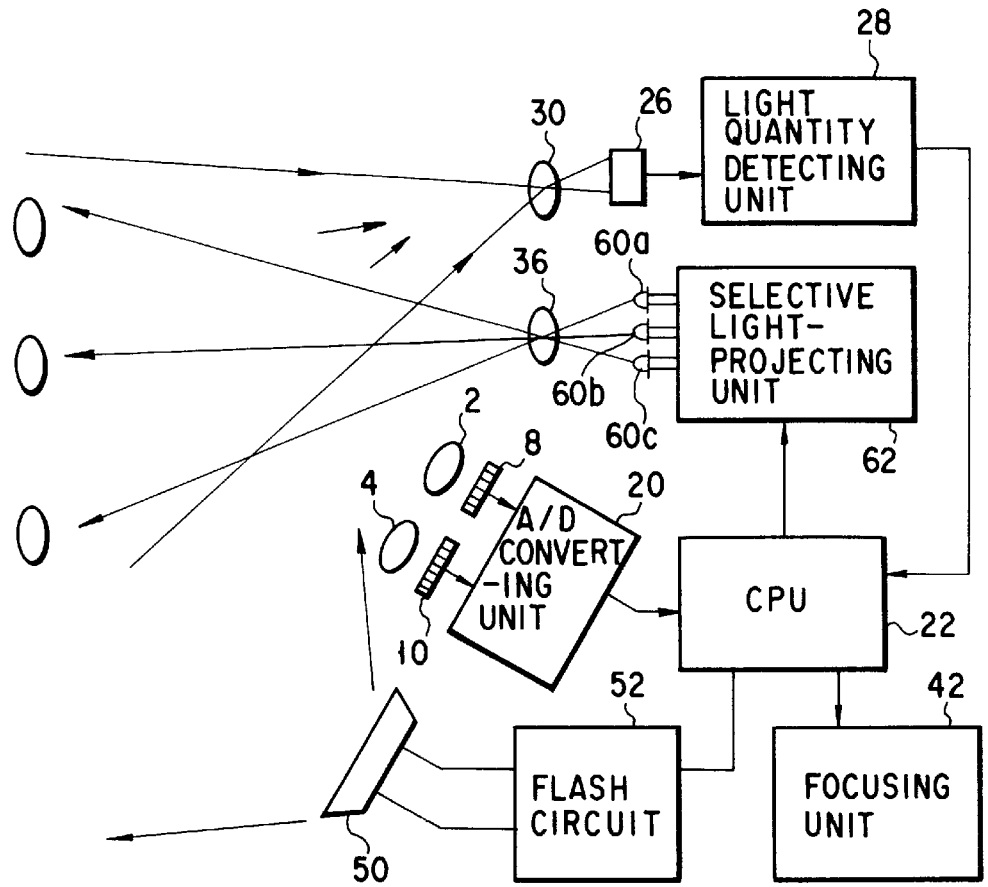
F I G. 11A
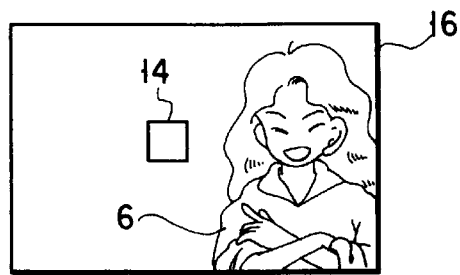
F I G. 11B

DISTANCE MEASURING APPARATUS

BACKGROUND OF THE INVENTION

The present invention relates to a distance measuring apparatus and, more particularly, to a distance measuring apparatus used for, e.g., measuring the distance to a target object (object to be photographed).

In general, distance measuring apparatuses have conventionally used the principle of trigonometric distance measurement.

Such distance measuring apparatuses can be classified into an active scheme type using reflected light upon projecting distance measurement light, and a passive scheme type using the correlation between the luminance distributions of a target object when viewed from two points.

Both types of distance measuring apparatuses are employed for many cameras.

However, a distance measuring apparatus of the active scheme type cannot reliably measure distance when the target object is located farther than the projected distance measurement light can reach.

A distance measuring apparatus of the passive scheme type, moreover, cannot reliably measure distance because of an out-of-focus state which occur when the luminance difference between the luminance distributions of the target object is small, i.e., the contrast is low, or when the contrast of objects except for the main target object is high, e.g., when a person stands with a night scene in the background.

To compensate for the weak points of the two schemes, a hybrid distance measuring apparatus using a combination of the two schemes is proposed and well known.

If, however, the active and passive schemes are simply used, the above-described hybrid distance measuring apparatus using a combination of the two schemes requires a high manufacturing cost and becomes bulky.

Even if the hybrid distance measuring apparatus switches these schemes using a common sensor by elaborating the circuit, a specific, complicated circuit is necessary, resulting in a high-cost apparatus though it can be small.

In addition, there is a well-known distance measuring apparatus using a scheme of compensating for the weak point of the passive scheme by projecting auxiliary light when the target object is dark, or when the luminance difference between the luminance distributions of the target object is small and the contrast is low.

The distance measuring apparatus of this type, however, cannot supply a sufficient light quantity when the target object is at a far distance, or when surroundings are bright and the contrast is low. This distance measuring apparatus is effectively used only when the target object is at a near distance.

When the light quantity of reflected light from the target object is small, auxiliary light may be projected for a long time and photocurrents of the reflected light may be integrated. However, projection of extra auxiliary light leads to energy waste.

BRIEF SUMMARY OF THE INVENTION

It is, therefore, an object of the present invention to provide a distance measuring apparatus capable of reliably measuring the distance to a target object with a low luminance or contrast.

According to a first aspect of the present invention, there is provided a distance measuring apparatus for measuring a distance to an object to be photographed, comprising: light-projecting means for projecting distance measurement light onto the object to be photographed; light quantity signal output means for outputting a reflected light quantity signal detected by splitting, from steady light, reflected light of the distance measurement light from the object to be photographed; first distance measuring means for determining the distance to the object to be photographed on the basis of the reflected light quantity signal output from the light quantity signal output means; second distance measuring means for receiving images of the object to be photographed with a pair of sensor arrays, and determining the distance to the object to be photographed on the basis of a phase difference between a pair of luminance pattern signals output from the pair of sensor arrays; and control means for selectively controlling the first and second distance measuring means on the basis of the reflected light quantity signal output from the light quantity signal output means upon projecting light from the light-projecting means, thereby obtaining the distance to the object to be photographed.

According to a second aspect of the present invention, there is provided a distance measuring apparatus for measuring a distance to an object to be photographed, comprising: light-projecting means for projecting distance measurement light onto the object to be photographed; light quantity signal output means for outputting a reflected light quantity signal detected by splitting, from steady light, reflected light of the distance measurement light from the object to be photographed; first distance measuring means for detecting the distance to the object to be photographed on the basis of the reflected light quantity signal output from the light quantity signal output means; second distance measuring means for receiving images of the object to be photographed with a pair of sensor arrays, and detecting the distance to the object to be photographed on the basis of a phase difference between a pair of luminance pattern signals output from the pair of sensor arrays; and control means for performing distance measurement with the second distance measuring means without projecting the distance measurement light from the light-projecting means, and when the distance to the object to be photographed cannot be detected, detecting the distance to the object to be photographed with one of the first and second distance measuring means while projecting the distance measurement light from the light-projecting means.

According to a third aspect of the present invention, there is provided a distance measuring apparatus for measuring a distance to an object to be photographed, comprising: a light-projecting element for projecting distance measurement light onto the object to be photographed; a light quantity signal detecting circuit for outputting a reflected light quantity signal detected by splitting, from steady light, reflected light of the distance measurement light from the object to be photographed; a sensor array for receiving images of the object to be photographed at two different positions, and outputting a pair of luminance distribution signals corresponding to the images of the object to be photographed; and a microprocessor capable of selectively inputting the reflected light quantity signal from the light quantity signal detecting circuit and the luminance distribution signals from the sensor array, the microprocessor first detecting the distance to the object to be photographed on the basis of a phase difference between the pair of luminance distribution signals, and when the detection is impossible, determining on the basis of the reflected light quantity signal whether the object to be photographed is at a predetermined distance.

According to a fourth aspect of the present invention, there is provided a distance measuring apparatus for measuring a distance to an object to be photographed, comprising: a light-emitting element for projecting distance measurement light for performing distance measurement onto the object to be photographed; a light-receiving element for receiving reflected light of the distance measurement light from the object to be photographed, and outputting a photoelectrically converted signal corresponding to a received light quantity; a light quantity detecting circuit for receiving the photoelectrically converted signal from the light-receiving element, and removing a signal component corresponding to steady light to output a reflected light quantity signal; a sensor array for receiving images of the object to be photographed at two different positions, and outputting a pair of luminance distribution signals corresponding to the images of the object to be photographed; and a microprocessor for receiving the reflected light quantity signal from the light quantity detecting circuit and the pair of luminance distribution signals from the sensor array, and selecting either one of the reflected light quantity signal and the luminance distribution signals to calculate the distance to the object to be photographed on the basis of the selected signal.

According to a fifth aspect of the present invention, there is provided a distance measuring apparatus for measuring a distance to an object to be photographed, comprising: a light-emitting element for projecting distance measurement light for performing distance measurement onto the object to be photographed; a light-receiving circuit which includes a light-receiving element for receiving reflected light of the distance measurement light from the object to be photographed, and outputs a reflected light quantity signal obtained by splitting a steady light component from an output from the light-receiving element; a sensor array for receiving images of the object to be photographed at two different positions, and outputting a pair of luminance distribution signals corresponding to the images of the object to be photographed; and a microprocessor for calculating the distance to the object to be photographed on the basis of the pair of luminance distribution signals output from the sensor array, and determining on the basis of the reflected light quantity signal output from the light-receiving circuit whether the object to be photographed is at a distance longer than a predetermined distance.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram showing the arrangement of a distance measuring apparatus according to the first embodiment of the present invention;

FIG. 2A is a view for explaining the distance measurement principle of a distance measuring apparatus of the passive scheme;

FIGS. 2B and 2C are views showing scenes which the distance measuring apparatus of the passive scheme can hardly cope with;

FIG. 2D is a flow chart for explaining the operation of the distance measuring apparatus according to the first embodiment;

FIG. 3 is a flow chart for explaining the operation of a modification of the distance measuring apparatus;

FIG. 4 is a block diagram showing the arrangement of main part of a camera having a distance measuring apparatus according to the second embodiment of the present invention;

FIGS. 5A and 5B are views for explaining the distance measurement principle of the distance measuring apparatus mounted on the camera;

FIGS. 6A and 6B are views for explaining that distance can be accurately measured with an intense light source on the background;

FIG. 11A is a block diagram showing the arrangement of main part of a camera having a distance measuring apparatus according to the fourth embodiment of the present invention;

FIG. 11B is a view showing a scene in which the target object is not at the central portion of a frame to disable focusing;

DETAILED DESCRIPTION OF THE INVENTION

Figure 7:
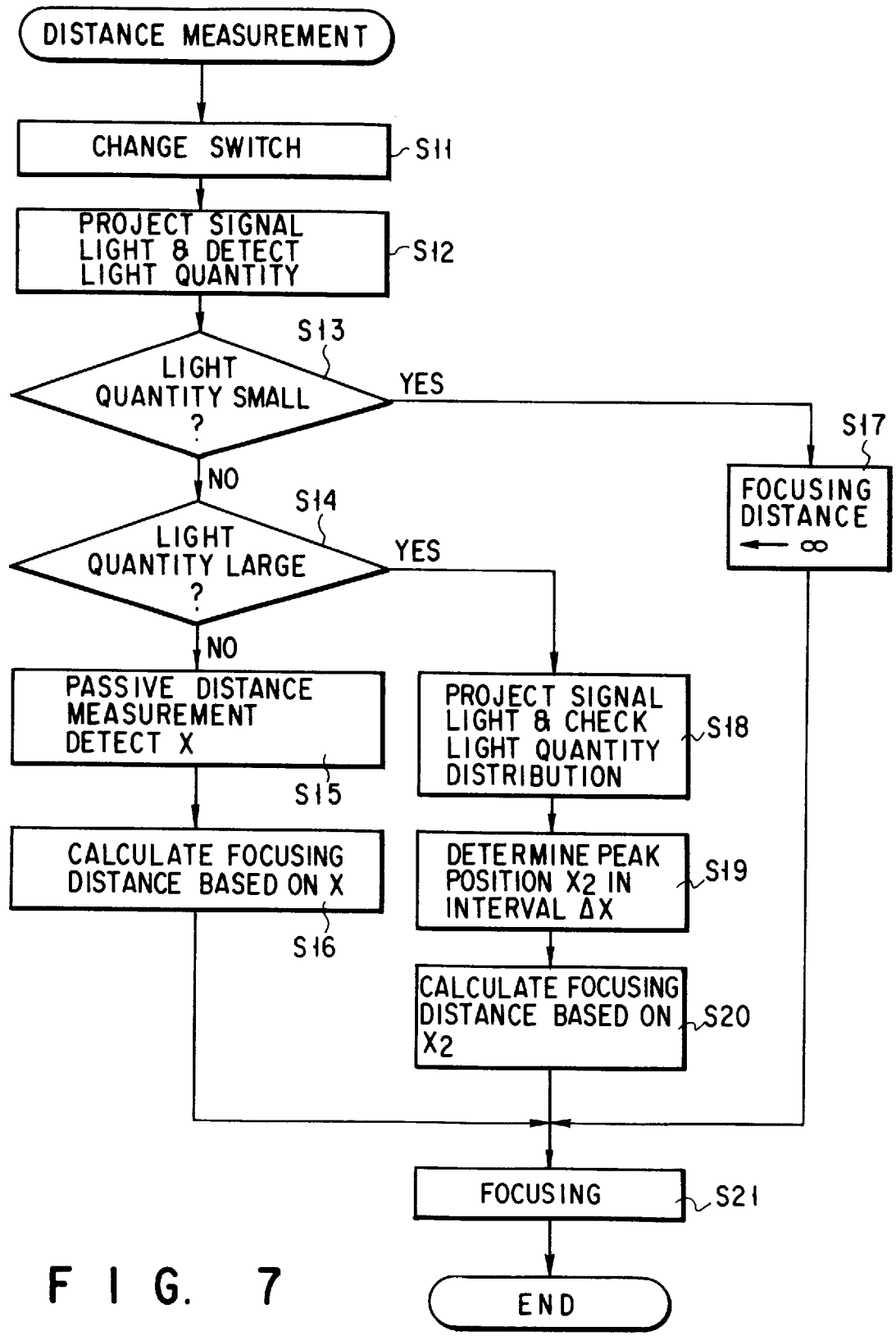
FIG. 7 is a flow chart for explaining the operation of the distance measuring apparatus mounted on the camera according to the second embodiment.

Reference will now be made in detail to the presently preferred embodiments of the invention as illustrated in the accompanying drawings, in which like reference characters designate like or corresponding parts throughout the several drawings.

Prior to the description of embodiments of the present invention, the principle of a distance measuring apparatus of the above-described passive scheme will be explained to facilitate the understanding of the present invention.

FIG. 2A is a view for explaining the distance measurement principle of the distance measuring apparatus of the passive scheme.

In FIG. 2A, light-receiving lenses 2 and 4 guide light coming from a target object 6 to sensor arrays 8 and 10, respectively.

When the target object 6 has a distinct difference in luminance, the photocurrents output from the respective light-receiving elements constituting the sensor arrays 8 and 10 are accumulated in capacitors which are connected to the respective light-receiving element and integrated.

By detecting this integral voltage, light quantity distributions 12 on the sensor arrays 8 and 10 as shown conceptually in FIG. 2A can be converted to electrical signals.

At this time, since parallax exists due to an interval (base length) S between the two light-receiving lenses 2 and 4, the light quantity distributions 12 generated on the sensor arrays 8 and 10 have a difference X in position. Therefore, if the focal length of each of the light-receiving lenses 2 and 4 is represented by f, a distance L to the target object is given by:

$$L = S \times f / X \quad (1)$$

However, when the luminance difference in the luminance distribution at a distance measurement point 14 is not distinct, i.e., the contrast is low, or when the luminance is low, the difference X cannot be accurately detected.

Distance measurement fails at a high probability for, e.g., a landscape scene like the one shown in a frame 16 of FIG. 2B because its contrast is low.

Also in a dark situation like the one shown in a frame 16 of FIG. 2C, the luminance difference in the luminance distribution of the target object is small, and the distance measurement accuracy is low.

According to data of certain distance measurement, 80% or more of scenes in which distance cannot be accurately measured fall in these categories.

Next, a distance measuring apparatus according to the first embodiment of the present invention will be described.

FIG. 1 is a block diagram showing the arrangement of the distance measuring apparatus according to the first embodiment of the present invention.

In FIG. 1, light-receiving lenses 2 and 4 and sensor arrays 8 and 10 are identical to the constituent members of the distance measuring apparatus of the passive scheme shown in FIG. 2A. These members form the second light-receiving unit.

An analog-to-digital (A/D) converting unit 20 converts the analog signals output from the sensor arrays 8 and 10 into digital signals, and supplies them to an arithmetic and control unit (to be referred to as a CPU hereinafter) 22 constituted by a one-chip microcomputer or the like.

The operation of the distance measuring apparatus of the first embodiment will be explained.

The CPU 22 controls the light-projecting operation of a light-projecting unit 24 to project distance measurement light onto a target object.

At this time, since the light-projecting unit 24 and a sensor 26 face the target object, the light reflected by the target object is received by the sensor 26 serving as the first light-receiving unit.

The output from the sensor 26 is divided by a light quantity detecting unit 28 into a reflected signal light component $P_1$ of only the distance measurement light and a steady light component $P_0$ of steadily irradiated light except for the distance measurement light.

The CPU 22 receives the reflected signal light component $P_1$ obtained in this manner to calculate the distance to the target object.

FIG. 2D is a flow chart for explaining the operation of the distance measuring apparatus according to the first embodiment.

First, the CPU 22 detects the light quantity signal $P_0$ of steady light incident on the sensor 26 from a steady light detecting circuit 28b, while keeping the light-projecting unit 24 inoperative (step S1).

The CPU 22 operates the light-projecting unit 24 to project distance measurement light onto the target object. The reflected light from the target object is received by the sensor 26. Using a light quantity detecting circuit 28a, the CPU 22 detects the reflected light quantity signal PI obtained by removing only the steady light component from the photoelectrically converted signal output from the sensor 26 (step S2).

The CPU 22 compares the detected light quantity signal $P_1$ with a predetermined value. When the light quantity signal $P_1$ is smaller than the predetermined value, the flow branches to step S7' to determine the distance to the object to be photographed in accordance with the magnitude of the light quantity signal $P_1$.

For this purpose, one or a plurality of determination values are prepared in advance to determine the distance to the object to be photographed.

When the light quantity signal $P_1$ is larger than the predetermined value as a result of the above-described comparison between the light quantity signal $P_1$ and the predetermined value, a pair of luminance distribution signals from the sensor arrays 8 and 10 are used to determine the distance to the object to be photographed by a passive method (known phase difference method) (step S6').

As described above, according to the first embodiment, a distance measuring apparatus capable of accurately performing high-speed distance measurement with a simple arrangement even for a low-contrast target object or even in a dark environment can be provided.

This distance measuring apparatus projects auxiliary light in advance, and removes the steady light component from the light reflected by the target object to obtain the magnitude of only the auxiliary light component. Therefore, whether projection of the auxiliary light is effective can be determined at a high speed. Unwanted auxiliary light is not projected to avoid energy waste of the power supply.

In the first embodiment, steady light and reflected signal light of distance measurement light can be separately measured. Therefore, it can be easily determined that clear contrast cannot be obtained even if a large quantity of signal light is irradiated in a high-luminance, low-contrast situation.

Next, the operation of a modification of the first embodiment will be described with reference to a flow chart shown in FIG. 3.

The arrangement of this modification is the same as that in the first embodiment, and only its operation is different from that of the flow chart shown in FIG. 2D.

First, the CPU 22 detects the light quantity $P_0$ of steady light incident on the sensor 26 from the output from the steady light detecting circuit 28b, while keeping the light-projecting unit 24 inoperative (step S1).

The CPU 22 operates the light-projecting unit 24 to project distance measurement light onto the target object. Of the light quantity of the light incident on the sensor 26 upon being reflected by the target object, the light quantity $P_1$ of the reflected signal light of only the distance measurement light is detected (step S2).

At this time, the incoming light on the sensor 26 consists of the reflected signal light of the distance measurement light in addition to the reflected light of the steady light.

For this reason, by subtracting the light quantity $P_0$ of the steady light from the light quantity of the light incident on the sensor 26 by the steady light detecting circuit 28b, the CPU 22 can use the light quantity detecting circuit 28a to calculate use the light quantity $P_1$ of the reflected signal light of only the distance measurement light reflected by the target object.

The CPU 22 checks whether the light quantity $P_1$ of the reflected signal light of only the distance measurement light is extremely smaller (than a predetermined value) (step S3).

When the light quantity of light projected from the light-projecting unit 24 is constant, the light quantity signal $P_1$ decreases as the distance to the target object increases.

When the light quantity $P_1$ is extremely small, i.e., in a landscape scene like the one shown in FIG. 2B, the flow branches to step S7 to set the distance to the target object at infinity. With this setting, distance measurement errors in distance measurement of the above-described passive scheme can be prevented.

Thereafter, this operation ends.

On the other hand, when the light quantity $P_1$ is not extremely small in step S3, the CPU 22 checks whether the ratio ($P_1/P_0$) of the light quantities $P_1$ and $P_0$ obtained in steps S2 and S1 is larger than a predetermined value a (step S4).

When the ratio of the light quantities $P_1$ and $P_0$ is larger than the predetermined value a, the CPU 22 determines a dark situation as shown in FIG. 2C. The CPU 22 causes the light-projecting unit 24 to project light again, and operates the sensor array 8 in synchronism with this.

With this operation, the CPU 22 obtains the incident position, on the sensor array 8, of the reflected signal light reflected by the target object.

According to the principle of trigonometric distance measurement, this incident position is spaced farther apart from the optical axis of the light-receiving lens 2 as the target object is at a farther distance, and changes in accordance with the distance to the target object.

For this reason, the analog outputs from the respective light-receiving elements which form the sensor array 8 are converted into digital signals by the A/D converting unit 20.

When the CPU 22 receives the digital signals, distance measurement of the active scheme becomes possible on the basis of the positional relationship of the light-receiving element which exhibits the peak value of the digital signals (step S5).

In this manner, distance can be measured in a dark situation as shown in FIG. 2C.

Thereafter, this operation ends.

Note that light projected from the light-projecting unit 24 in step S5 may be used as auxiliary light for distance measurement of the passive scheme.

In this case, the CPU 22 must receive the output from the sensor array 10 to calculate the correlation between the luminance distributions of the outputs from the two sensor arrays 8 and 10, resulting in long distance measurement time.

Alternatively, the CPU 22 may examine the correlation between the luminance distributions in accordance with the outputs from the two sensor arrays 8 and 10, and then determine whether to operate the light-projecting unit 24.

In this case, the light quantity of steady light is small in a dark situation, and the photocurrents output from the sensor arrays 8 and 10 are weak. If light is continuously received and integrated until determination of the correlation is complete, the loss of time increases.

On the other hand, when the ratio of the light quantities $P_1$ and $P_0$ is not larger than the predetermined value a, the CPU 22 performs distance measurement of the passive scheme using the sensor arrays 8 and 10 (step S6).

Thereafter, this operation ends.

In step S3, one determination level is used for the light quantity $P_1$ to determine whether the distance is infinity. By setting a plurality of determination levels, a plurality of distances can be determined in addition to infinity, as a matter of course.

Next, a distance measuring apparatus according to the second embodiment of the present invention will be described.

The second embodiment exemplifies a distance measuring apparatus mounted on a camera. The sensor 26 in the first embodiment also functions as a remote control light-receiving element for remote-controlling the camera, thereby attaining space and cost reductions.

FIG. 4 is a block diagram showing the arrangement of main part of the camera having the distance measuring apparatus of the second embodiment.

Generally, in the remote control distance measuring apparatus of a camera, when infrared rays are transmitted from a transmitter (not shown) in a predetermined pulse pattern so as not to be influenced by steady light, an infrared ray sensor 26 which is not sensitive to visible light receives it through a light-receiving lens 30 to control the camera in accordance with the received pulse pattern.

Also in a light-projecting unit 24 of this embodiment, a driver circuit 32 is driven to cause an infrared-emitting diode (to be referred to as an IRED hereinafter) 34 to emit light. The output light from the IRED 34 is condensed on a light-projecting lens 36 to project the light onto a target object.

The driver circuit 32 supplies a current to the IRED 34 under the control of a CPU 22.

The signal light projected from the light-projecting unit 24 on the target object is reflected by the target object and becomes incident on the sensor 26. At this time, the CPU 22 switches a switch 38 to the distance measurement side to input the output from the sensor 26 to a light quantity detecting unit 28, similar to the first embodiment shown in FIG. 1.

To the contrary, when the sensor 26 is used for remote control, the CPU 22 switches the switch 38 to the remote control side to input the output from the sensor 26 to a remote control processing circuit 40.

Light-receiving lenses 2 and 4, sensor arrays 8 and 10, and an analog-to-digital (A/D) converting unit 20 are identical to the members as part of the distance measuring apparatus described in the first embodiment shown in FIG. 1.

The reflected signal light of the light projected from the light-projecting unit 24 also enters the sensor array 8 through the light-receiving lens 2. Distance can also be measured using the incident position of this reflected signal light, similar to the first embodiment.

The CPU 22 controls the operation of the whole camera, in addition to distance measurement. The CPU 22 controls a focusing unit 42 in accordance with the result of distance measurement. Further, the CPU 22 controls the exposure in a photographing operation.

FIGS. 5A and 5B are views for explaining the distance measurement principle of the distance measuring apparatus mounted on the camera according to the second embodiment.

In FIG. 5A, the distance between the principal points of the light-projecting lens 36 and the light-receiving lens 2 is set equal to a base length S2, and the focal length of the light-receiving lens 2 is represented by f.

Normally, signal light reflected by the target object present at a distance L forms a light spot exhibiting a light quantity distribution 44a having a peak at a position $X_2$ on the sensor array 8, as shown in FIG. 5B.

The distance L and the position $X_2$ have the same relationship as that of the distance measurement principle of the passive scheme shown in FIG. 2A, and can be expressed by the following equation:

$$X_2 = S_2 \times f / L \tag{2}$$

Even if the contrast of luminance of the target object is very low, the light spot exhibiting the light quantity distribution 44a having the peak at the position $X_2$ on the sensor array 8 can be similarly formed on the sensor array 8 by projecting distance measurement light from the light-projecting unit 24.

If, therefore, the CPU 22 receives the outputs from the respective light-receiving elements which constitute the sensor array 8 to obtain the position $X_2$, the distance L to the target object can be calculated from equation (2) above.

When the light quantity of reflected signal light reflected by the target object is small, a light spot exhibiting a light quantity distribution 44b not having a clear peak is formed on the sensor array 8, as shown in FIG. 5B.

In the second embodiment, the distance measuring apparatus therefore comprises the light quantity detecting unit 28 capable of splitting light incident on the sensor 26 into steady light and reflected signal light of light projected from the light-projecting unit 24, and detecting the split components.

The CPU also determines the quantities of these light components, and performs distance measurement based on the above-described principle only when the reflected signal light incident on the sensor array 8 exhibits the clear light quantity distribution 44a and forms a light spot.

The following description elucidates why the distance to a target object 6 can be accurately measured with the above-described arrangement even when, e.g., a lantern is on the background, as shown in FIG. 6A, i.e., even in a situation having an intense light source on the background, which the conventional distance measuring apparatus of the passive scheme can hardly cope with.

FIG. 6B is a graph showing the light quantity distribution on the sensor array in a situation having an intense light source on the background.

A light quantity distribution 46b shows the output from the sensor array before projecting light from the light-projecting unit 24. A light quantity distribution 46a shows the monitored output from the sensor array while projecting light from the light-projecting unit 24.

At this time, the distance to the target object can be accurately calculated from equation (2) above by using the position $X_2$ of the peak of a new light quantity distribution 46a generated upon projecting light from the light-projecting unit 24.

In a conventional case, when, e.g., a lantern is on the background, a peak may be generated in the light quantity distribution 46b due to the light of the lantern, independently of the target object subjected to distance measurement, resulting in distance measurement errors.

In the second embodiment, such distance measurement errors are prevented by projecting signal light from the light-projecting unit 24.

Further, in the second embodiment, the light quantity detecting unit 28 is arranged to check whether a clear peak like the one in the light quantity distribution 46a can be obtained, without reading the outputs from the sensor array before and after projecting distance measurement light from the light-projecting unit 24.

With this arrangement, the time required for distance measurement can be shortened in the distance measuring apparatus according to the second embodiment.

The operation of the camera having the distance measuring apparatus of the second embodiment will be explained with reference to a flow chart shown in FIG. 7.

First, the CPU 22 switches the switch 38 to the light quantity detecting unit 28 side in order to input the output from the sensor 26 to the light quantity detecting unit 28 (step S11).

The CPU 22 drives the driver circuit 32 to cause the IRED 34 to project infrared rays. Of the light quantity of light incident on the sensor 26 upon being reflected by the target object, the light quantity $P_1$ of the reflected signal light of only the distance measurement light is detected by the light quantity detecting unit 28 (step S12).

The CPU 22 checks whether the obtained light quantity of the reflected signal light is smaller than a first predetermined value (step S13).

If the light quantity is smaller than the first predetermined value, the CPU 22 determines that the target object is at a far distance, and sets the focusing distance of the photographing lens of the camera to infinity (step S17).

The CPU 22 causes the focusing unit 42 to adjust the focus to infinity (step S21), thereby completing this operation.

On the other hand, if the light quantity of the reflected signal light is not smaller than the first predetermined light quantity in step S13, the CPU 22 checks whether this light quantity is larger than a second predetermined light quantity (step S14).

Note that the first predetermined light quantity<the second predetermined light quantity.

If the light quantity is larger than the second predetermined light quantity, the target object can be considered to be at a relatively near distance. The CPU 22 detects the light quantity distribution of the reflected signal light incident on the sensor array 8, while projecting distance measurement light from the light-projecting unit 24 (step S18).

Since the target object exists within a predetermined distance range, the CPU 22 determines that the peak position of the reflected signal light incident on the sensor array 8 also falls within a predetermined range $\Delta X$. The CPU 22 detects the peak position within the range $\Delta X$ and defines the result as the position $X_2$ (step S19).

The CPU 22 calculates the distance L to the target object, i.e., the focusing distance L on the basis of equation (2) using the position $X_2$ obtained in the above step S19 (step S20).

The CPU 22 causes the focusing unit 42 to adjust the focus to the distance L (step S21), thereby completing this operation.

If the light quantity of the reflected signal light is not larger than the second predetermined light quantity in step S14, distance measurement of the normal passive scheme is performed.

First, the CPU 22 detects a difference X in position between the light distributions generated on the sensor arrays 8 and 10 (step S15).

The CPU 22 calculates the distance L to the target object, i.e., the focusing distance L by substituting the detected difference X in equation (1) above (step S16).

The CPU 22 causes the focusing unit 42 to adjust the focus to the distance L (step S21), thereby completing this operation.

Next, a distance measuring apparatus according to the third embodiment of the present invention will be described.

The third embodiment exemplifies a distance measuring apparatus mounted on a camera. A flash means of a camera is used as the light-projecting unit 24 in the second embodiment. Since the light-projecting unit 24 need not be separately arranged, space and cost reductions can be attained.

Figure 8:
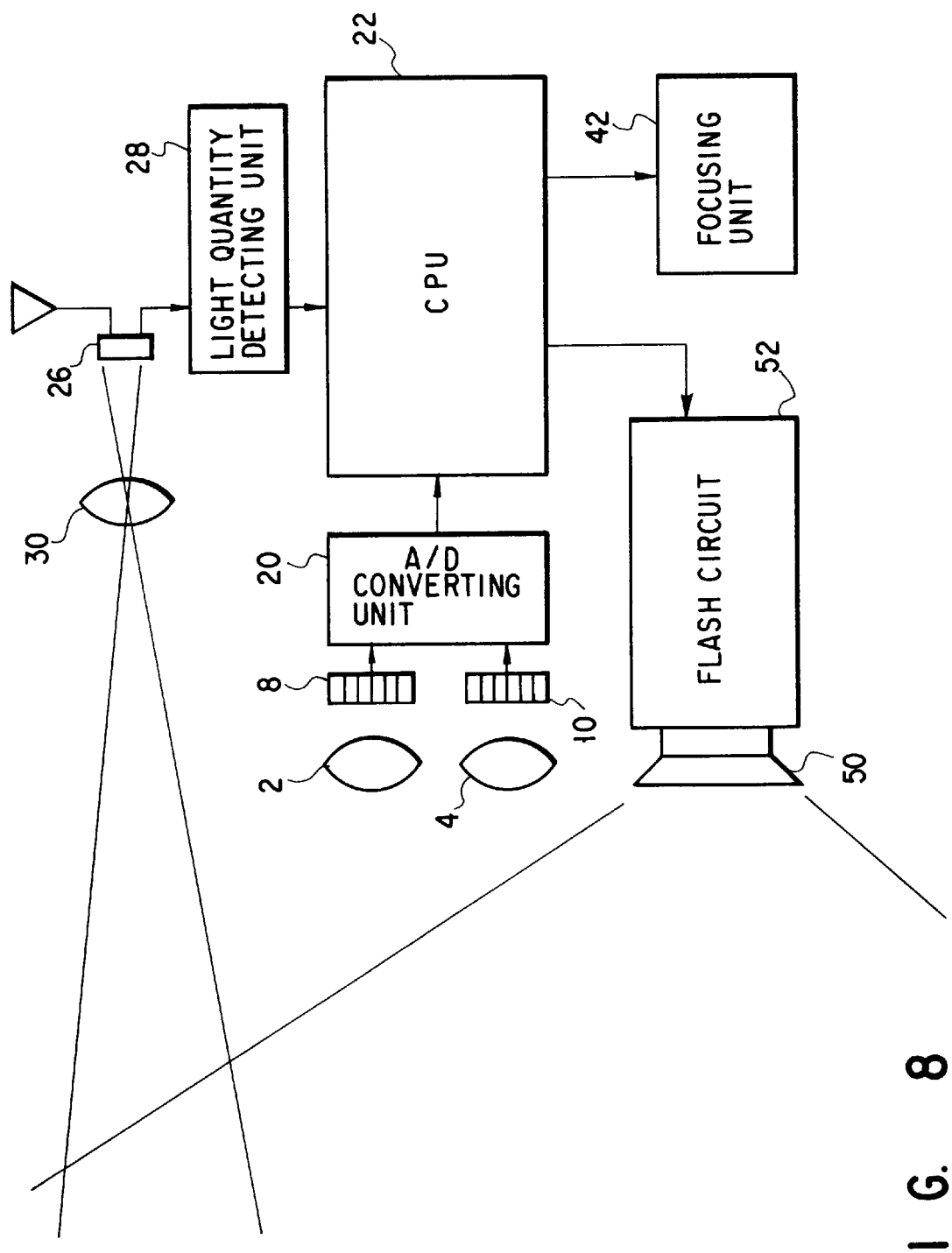
FIG. 8 is a block diagram showing the arrangement of main part of a camera having a distance measuring apparatus according to the third embodiment of the present invention.

FIG. 8 is a block diagram showing the arrangement of main part of the camera having the distance measuring apparatus of the third embodiment.

In FIG. 8, a flash unit 50 is constituted by a xenon discharge tube and a reflector, and irradiates light on a target object in a photographing operation to correct underexposure.

A flash circuit 52 is constituted by a booster circuit for applying a high voltage to the xenon discharge tube, an energy accumulation capacitor, a trigger voltage applying circuit for discharge induction, and the like. The flash circuit 52 is driven under the control of the CPU 22.

When the flash unit 50 irradiates flash light toward the target object, a sensor 26 for receiving signal light reflected by the target object covers only a very narrow range of the target object through a light-receiving lens 30.

With this arrangement, even if light is irradiated on a wide range by using the flash unit 50 as the light-projecting unit 24, only part of the reflected signal light can be observed free from any influence of the background and the like.

The density of the luminous flux emitted from the flash unit 50 is 40 times as large as that of the IRED 34 in the second embodiment. Therefore, they can be effectively used as distance measurement light.

Note that light-receiving lenses 2 and 4, sensor arrays 8 and 10, an analog-to-digital (A/D) converting unit 20, and a light quantity detecting unit 28 are identical to the members as part of the distance measuring apparatus described as the first embodiment shown in FIG. 1, and a description thereof will be omitted.

Figure 9:
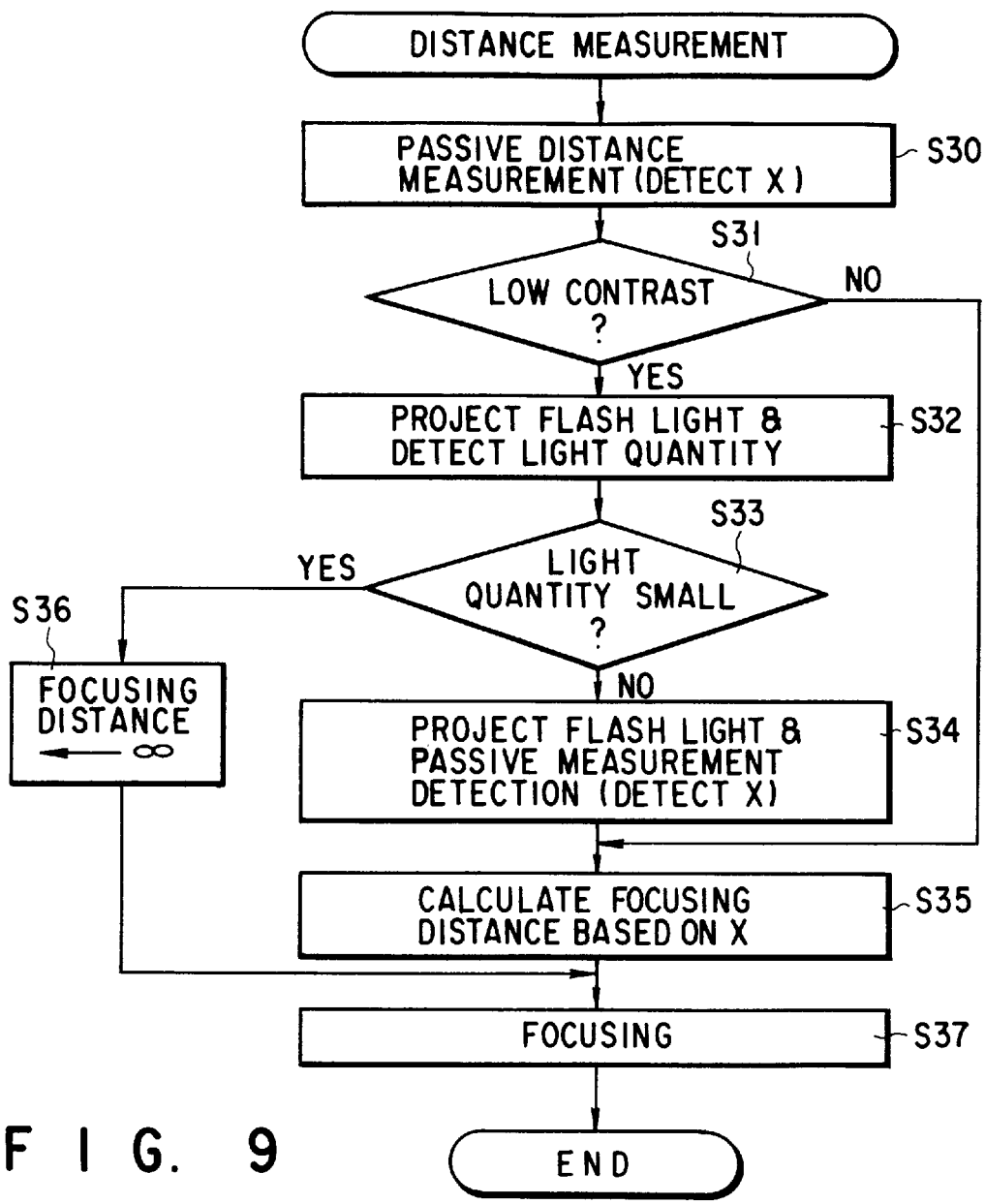
FIG. 9 is a flow chart for explaining the operation of the distance measuring apparatus mounted on the camera according to the third embodiment.

The operation of the camera having this distance measuring apparatus will be explained with reference to a flow chart shown in FIG. 9.

First, the CPU 22 performs distance measurement of the passive scheme described in the first embodiment to detect the difference X in position between the light quantity distributions generated on the sensor arrays 8 and 10 (step S30).

The CPU 22 checks on the basis of the output results of the sensor arrays 8 and 10 whether the target object has no difference in luminance and is a low-contrast target object (step S31).

If the target object is not a low-contrast one, the flow jumps to step S35, and the CPU 22 calculates the distance L to the target object, i.e., the focusing distance L by substituting the detected difference X in equation (1) (step S35).

The CPU 22 causes a focusing unit 42 to adjust the focus to the distance L (step S40), thereby completing this operation.

On the other hand, if the target object is a low-contrast one in step S31, and it is determined that distance measurement of the passive scheme is impossible, the CPU 22 drives the flash circuit 52 to cause the flash unit 50 to emit flash light.

The quantity of the signal light reflected by the target object is detected by the sensor 26 (step S32).

The CPU 22 checks whether the light quantity of the reflected signal light detected by the sensor 26 is smaller than a predetermined light quantity (step S33).

If the light quantity is smaller than the predetermined light quantity, the CPU 22 determines that the current scene is a landscape scene like the one shown in FIG. 2B, and that the focusing distance L is equivalent to infinity (step S36).

The CPU 22 causes the focusing unit 42 to adjust the focus to the distance L (step S40), thereby completing this operation.

On the other hand, if the light quantity of the reflected signal light is not smaller than the predetermined light quantity in step S33, the CPU 22 determines that the current scene is a dark scene like the one shown in FIG. 2C. The CPU 22 causes the flash unit 50 to emit flash light, thereby compensating for short in ambient light. The CPU 22 performs distance measurement of the passive scheme according to the principle described with reference to FIG. 2A, thereby detecting the difference X in position between the light quantity distributions generated on the sensor arrays 8 and 10 (step S34).

The CPU 22 calculates the distance L to the target object, i.e., the focusing distance L by substituting the detected difference X in equation (1) above (step S35).

The CPU 22 causes the focusing unit 42 to adjust the focus to the distance L (step S40), thereby completing this operation.

As described above, according to the third embodiment, a light-projecting unit need not be separately arranged by using strong flash light as auxiliary light for distance measurement. Therefore, the cost and space required to arrange the lightprojecting unit can be eliminated in designing the distance measuring apparatus.

The flash light is not suitable for distance measurement because it is generally irradiated in a wide range. However, this disadvantage can be eliminated by narrowing the range covered by the sensor 26.

With a simple arrangement as in the third embodiment, distance measurement can be accurately performed for target objects in a landscape scene and a dark scene like the ones shown in FIGS. 2B and 2C, which the conventional apparatus can hardly cope with.

Figure 10:
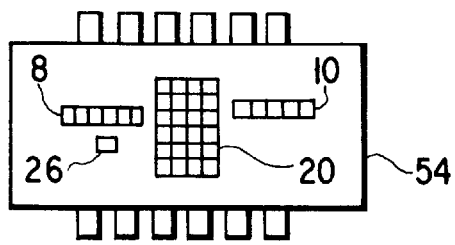
FIG. 10 is a view showing the layout of some of constituent members in a single package.

If the same process as that for the sensor arrays 8 and 10, the analog-to-digital converting unit 20, and the like is used to form the sensor 26 in the same chip, or the sensor 26 is arranged in a single package 54, as shown in FIG. 10, space and cost reductions can be attained.

In addition, one of light-receiving elements which constitute the sensor array 8 or 10 may function as the sensor 26.

Next, a distance measuring apparatus according to the fourth embodiment of the present invention will be described.

FIG. 11A is a block diagram showing the arrangement of main part of a camera having the distance measuring apparatus of the fourth embodiment.

Focusing may fail when a target object 6 does not exist at a central portion 14 of a frame 16, as shown in FIG. 11B.

In such a scene, the target object 6 (object to be photographed) must be searched for by performing distance measurement for several points on the frame. If the outputs from the sensor arrays 8 and 10 are monitored in every operation, a time lag increases.

In the fourth embodiment, therefore, the distance measuring apparatus comprises three light-emitting diodes (to be referred to as LEDs hereinafter) 60a, 60b, and 60c capable of projecting light onto three points within the frame 16, and a selective light-projecting unit 62 for selectively controlling light projection of these LEDs 60a, 60b, and 60c.

It is checked projection by which of the three LEDs 60a, 60b, and 60c results in the strongest reflected signal light returning to a sensor 26. On the basis of this result, distance measurement of the passive scheme is intensively performed for a portion from which the strongest reflected signal light returns by light-receiving lenses 2 and 4, sensor arrays 8 and 10, an A/D converting unit 20, and the like.

As the remaining arrangements are the same as those in the third embodiment, a description thereof is incorporated herein and will be omitted.

When the distance to the central portion of the frame is measured in this distance measuring apparatus, a light-receiving element of the sensor array 8 on the optical axis of the light-receiving lens 2 is used as a reference sensor, as shown in FIG. 2A. A luminance distribution identical to that obtained by this light-receiving element is detected by the sensor array 10 to perform distance measurement of the passive scheme described above.

Figure 12:
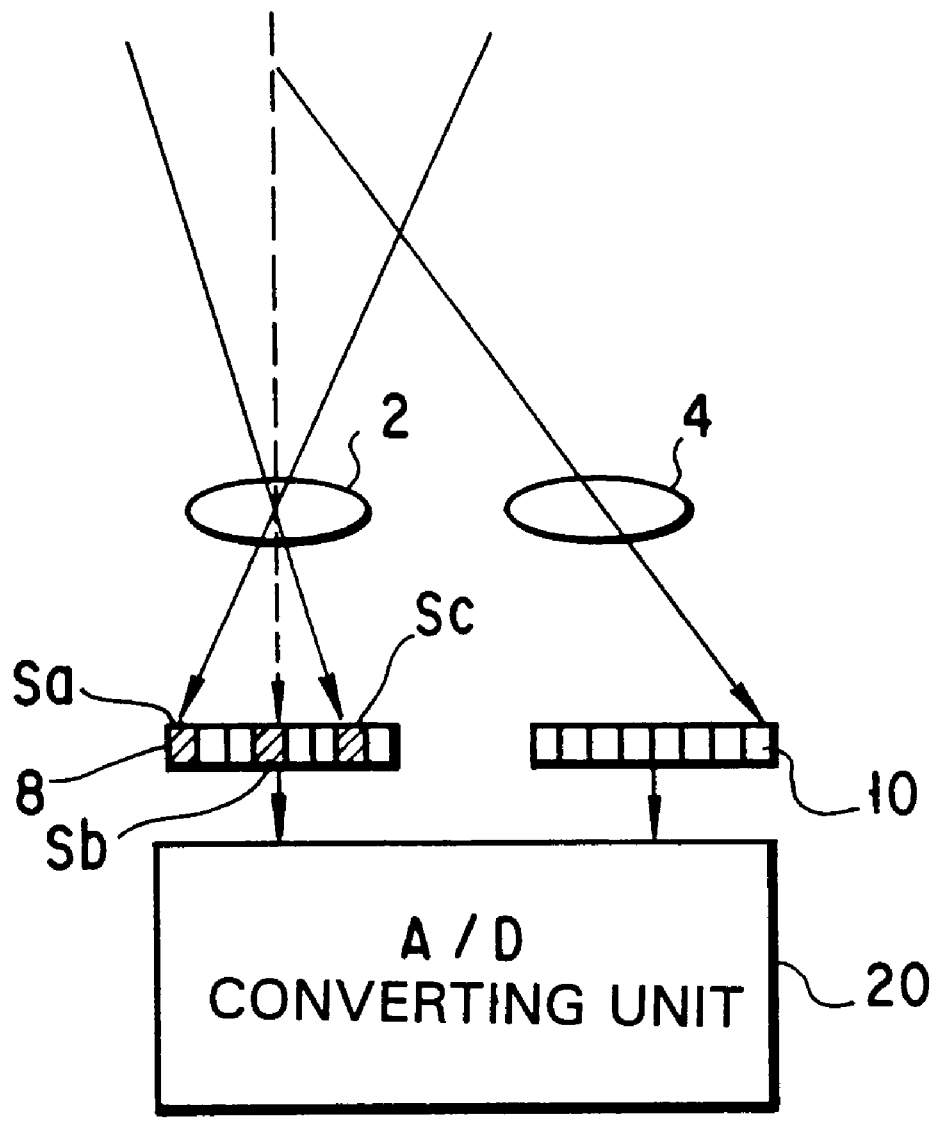
FIG. 12 is a view showing a reference sensor in distance measurement by the distance measuring apparatus mounted on the camera according to the fourth embodiment.

When the distance to a peripheral portion is measured, a light-receiving element Sa on the sensor array 8 is used as a reference sensor for the right side of the frame 16, or a light-receiving element Sc on the sensor array 8 is used as a reference sensor for the left side of the frame 16, as shown in FIG. 12. The luminance distribution generated on the sensor array 10 is detected to perform distance measurement of the passive scheme.

Figure 13:
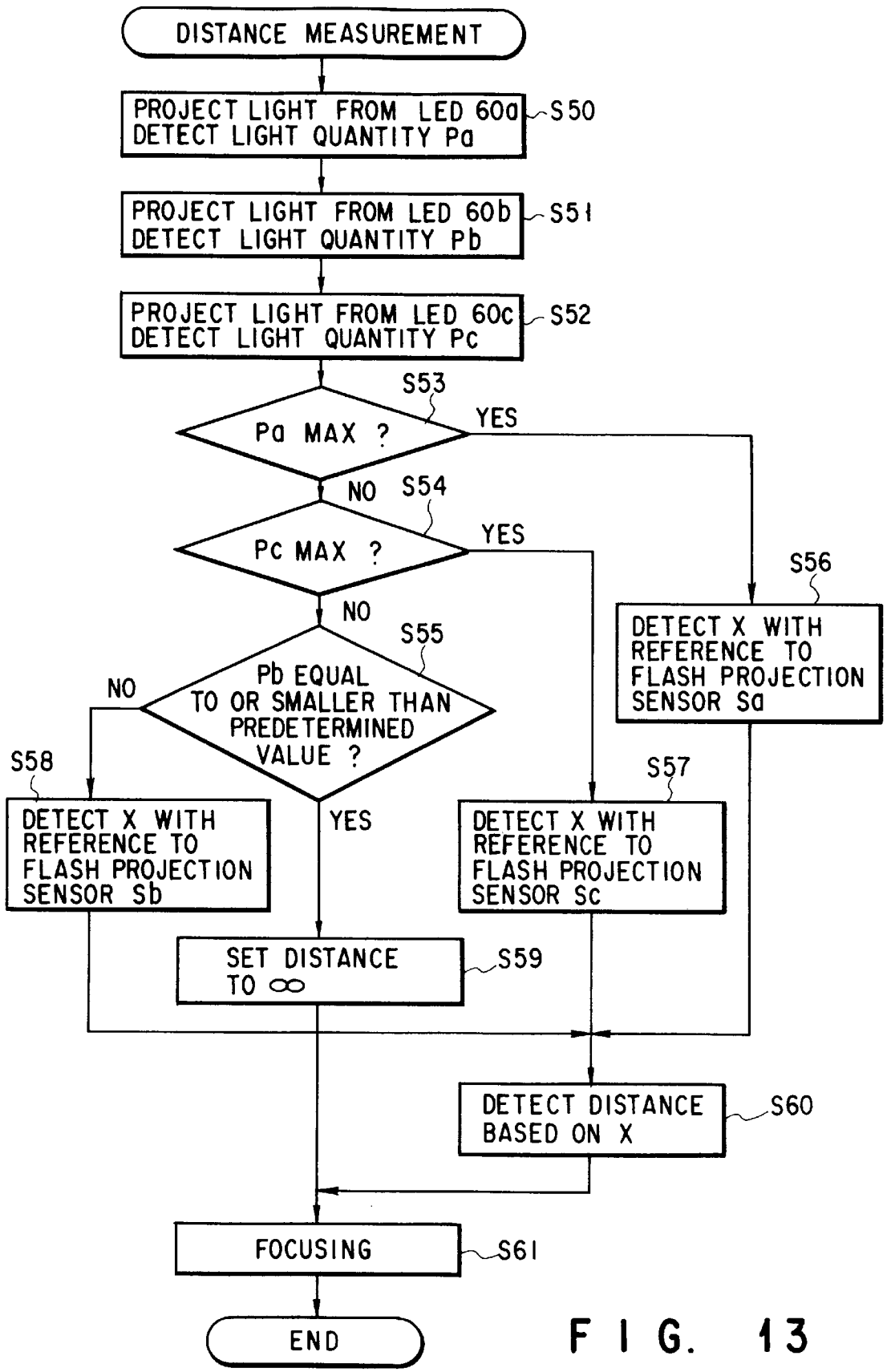
FIG. 13 is a flow chart showing the operation of the distance measuring apparatus mounted on the camera according to the fourth embodiment.

The operation of the camera having this distance measuring apparatus will be explained with reference to a flow chart shown in FIG. 13.

First, a CPU 22 causes the LEDs 60*a*, 60*b*, and 60*c* to sequentially emit beams through the selective light-projecting unit 62, thereby sequentially projecting beams on the right side, center, and left side of the frame 16.

At this time, the CPU 22 causes a light quantity detecting unit 28 to detect light quantities Pa, Pb, and Pc of the reflected signal beams which return to the sensor 26 (steps S50 to S52).

The CPU 22 determines in steps S53 and S54 which of the light quantities Pa, Pb, and Pc has the maximum value. The flow branches to the next processing to intensively perform distance measurement of the passive scheme in the return direction of the maximum light quantity.

More specifically, the CPU 22 determines whether, of the light quantities Pa, Pb, and Pc, the light quantity Pa is the maximum value (step S53).

If the light quantity Pa is the maximum value, the CPU 22 causes a flash unit 50 to project flash light, thereby compensating for short in ambient light. A difference X in position of the luminance distribution generated on the sensor array 10 is detected with reference to the light-receiving element Sa on the sensor array 8 (step S56).

The CPU 22 substitutes the detected difference X in equation (1) to calculate the distance L to the target object, i.e., the focusing distance L (step S60).

The CPU 22 causes a focusing unit 42 to adjust the focus to the distance L (step S61), thereby completing this operation.

On the other hand, if the light quantity Pa is not the maximum value in step S53, the CPU 22 checks whether the light quantity Pc is the maximum value (step S54).

If the light quantity Pc is the maximum value, the CPU 22 causes the flash unit 50 to project flash light, thereby compensating for short in ambient light. The difference X in position of the luminance distribution generated on the sensor array 10 is detected with reference to the light-receiving element Sc on the sensor array 8 (step S57).

The CPU 22 substitutes the detected difference X in equation (1) to calculate the distance L to the target object, i.e., the focusing distance L (step S60).

The CPU 22 causes the focusing unit 42 to adjust the focus to the distance L (step S61), thereby completing this operation.

On the other hand, if the light quantity Pc is not the maximum value in step S54, the CPU 22 determines that the light quantity Pb is the maximum value, and checks whether the light quantity Pb is equal to or smaller than a predetermined value (step S55).

If the light quantity Pb is neither equal to nor smaller than the predetermined value, i.e., larger than the predetermined value, the light quantity Pb is the maximum value and is larger than the predetermined value. The CPU 22 causes the flash unit 50 to project flash light, thereby providing auxiliary light. The difference X in position of the luminance distribution generated on the sensor array 10 is detected with reference to a light-receiving element Sb on the sensor array 8 (step S58).

The CPU 22 substitutes the detected difference X in equation (1) to calculate the distance L to the target object, i.e., the focusing distance L (step S60).

The CPU 22 causes the focusing unit 42 to adjust the focus to the distance L (step S61), thereby completing this operation.

If the light quantity Pb is equal to or smaller than the predetermined value in step S55, the CPU 22 determines that the focusing distance L is equivalent to infinity (step S59).

In step S55, the CPU 22 determines the magnitude of the light quantity of the reflected signal beam from the frame center. When the light quantity is equal to or smaller than the predetermined value, the CPU 22 determines that the current scene is a landscape scene, and adjusts the focus to infinity.

With this processing, distance measurement errors in distance measurement of a landscape scene like the one shown in FIG. 2B can be prevented.

Subsequently, the CPU 22 causes the focusing unit 42 to adjusthehe focus to the distance L (step S61), thereby completing this operation.

As described above, in the fourth embodiment, the three LEDs 60*a*, 60*b*, and 60*c* sequentially project beams, and distance measurement of the passive scheme is intensively performed in a direction along which, of the light quantities Pa, Pb, and Pc of the reflected signal beams returning to the sensor 26, the maximum light quantity has returned. Therefore, the time lag required to monitor the outputs from the sensor arrays 8 and 10 in every operation, and calculate the difference X in position between the light quantity distributions generated on the sensor arrays 8 and 10 on the basis of the results can be decreased.

In addition, auxiliary light need not be irradited in every operation to prevent energy waste.

According to the fourth embodiment, auto focusing can be attained with an energy saving design free from any time lag in distance measurement, and little objects to be photographed whose distances are difficult to measure.

According to the third embodiment, a simple, low-cost distance measuring apparatus capable of performing accurate distance measurement for a target object at a near or far distance with a low or high luminance and a low-contrast target object at a far distance can be provided.

As has been described in detail above, according to the present invention, a distance measuring apparatus capable of reliably performing distance measurement for an object to be photographed with a low luminance or contrast can be provided.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

I claim:

1. A distance measuring apparatus for measuring a distance to an object, comprising:

light-projecting means for projecting distance measurement light onto said object;

light quantity output signal means for detecting reflected light from said object attributable to the distance measurement light, wherein an intensity of the reflected light varies in accordance with the distance to the object, and for outputting a reflected light quantity signal obtained by splitting, from steady light, the reflected light;

first distance measuring means for determining the distance to said object based on the reflected light quantity signal output by said light quantity signal output means;

second distance measuring means for receiving images of said object using a pair of sensor arrays, and for determining the distance to said object based on a phase difference between a pair of luminance pattern signals output by said pair of sensor arrays; and control means for selectively controlling said first and second distance measuring means based on the reflected light quantity signal output by said light quantity signal output means when said light-projecting means projects the distance measurement light, thereby obtaining the distance to said object.

2. A distance measuring apparatus for measuring a distance to an object, comprising:

light-projecting means for projecting distance measurement light onto said object;

light quantity output signal means for detecting reflected light from said object attributable to the distance measurement light, wherein an intensity of the reflected light varies in accordance with the distance to the object, and for outputting a reflected light quantity signal obtained by splitting, from steady light, the reflected light;

first distance measuring means for determining the distance to said object based on the reflected light quantity signal output by said light quantity signal output means;

second distance measuring means for receiving images of said object using a pair of sensor arrays, and for determining the distance to said object based on a phase difference between a pair of luminance pattern signals output by said pair of sensor arrays;

control means for selectively controlling said first and second distance measuring means based on the reflected light quantity signal output by said light quantity signal output means when said light-projecting means projects the distance measurement light, thereby detecting the distance to said object; and third distance measuring means for receiving the reflected light from said object using one of said pair of sensor arrays when said light-projecting means projects the distance measurement light, and for detecting a light-received position of the reflected light based on an output from said sensor array, thereby detecting the distance to said object.

3. A distance measuring apparatus for measuring a distance to an object, comprising:

light-projecting means for projecting distance measurement light onto said object;

light quantity output signal means for outputting a reflected light quantity signal obtained by splitting, from steady light, a reflected portion of the distance measurement light projected onto said object;

first distance measuring means for determining the distance to said object based on the reflected light quantity signal output by said light quantity signal output means;

second distance measuring means for receiving images of said object using a pair of sensor arrays, and for determining the distance to said object based on a phase difference between a pair of luminance pattern signals output by said pair of sensor arrays;

control means for selectively controlling said first and second distance measuring means based on the reflected light quantity signal output by said light quantity signal output means when said light-protecting means projects the distance measurement light, thereby detecting the distance to said object; and third distance measuring means for receiving the reflected light from said object using one of said pair of sensor arrays when said light-projecting means projects the distance measurement light, and for detecting a light-received position of the reflected light based on an output from said sensor array, thereby detecting the distance to said object;

wherein said control means selects one of said second and third distance measuring means to obtain the distance to said object when the distance to said object obtained based on the reflected light quantity signal detected by said first distance measuring means is shorter than a predetermined distance.

4. An apparatus according to claim 3, wherein said first distance measuring means comprises means for detecting only the steady light and for outputting a steady light signal; and said control means selects one of said second and third distance measuring means based on the reflected light quantity signal and the steady light signal to calculate the distance to said object.

5. An apparatus according to claim 4, wherein said control means selects one of said second and third distance measuring means based on a ratio of the reflected light quantity signal and the steady light signal.

6. A distance measuring apparatus for measuring a distance to an object, comprising:

light-projecting means for projecting distance measurement light onto said object;

light quantity output signal means for outputting a reflected light quantity signal obtained by splitting, from steady light, a reflected portion of the distance measurement light projected onto said object;

first distance measuring means for determining the distance to said object based on the reflected light quantity signal output by said light quantity signal output means;

second distance measuring means for receiving images of said object using a pair of sensor arrays, and for determining the distance to said object based on a phase difference between a pair of luminance pattern signals output by said pair of sensor arrays; and control means for selectively controlling said first and second distance measuring means based on the reflected light quantity signal output by said light quantity signal output means when said light-projecting means projects the distance measurement light, thereby detecting the distance to said object;

wherein said first distance measuring means determines that the distance to said object is longer than a predetermined distance when the reflected light quantity signal is smaller than a predetermined value.

7. A distance measuring apparatus for measuring a distance to an object, comprising:

light-projecting means for projecting distance measurement light onto said object;

light quantity output signal means for outputting a reflected light quantity signal obtained by splitting, from steady light, a reflected portion of the distance measurement light projected onto said object;

first distance measuring means for determining the distance to said object based on the reflected light quantity signal output by said light quantity signal output means;

second distance measuring means for receiving images of said object using a pair of sensor arrays, and for determining the distance to said object based on a phase difference between a pair of luminance pattern signals output by said pair of sensor arrays; and control means for selectively controlling said first and second distance measuring means based on the reflected light quantity signal output by said light quantity signal output means when said light-projecting means projects the distance measurement light, thereby detecting the distance to said object;

wherein said distance measuring apparatus is operable together with a camera for photographing said object, said camera having a light-receiving element for receiving a light signal for instructing an operation from a remote controller and for outputting a remote control signal, and wherein said first distance measuring means includes a light-receiving unit which serves as said light-receiving element of said camera for outputting the remote control signal.

8. An apparatus according to claim 1, wherein said light-projecting means comprises a flash unit for emitting flash light.

9. A distance measuring apparatus for measuring a distance to an object, comprising:

light-projecting means for projecting distance measurement light onto said object;

light quantity output signal means for outputting a reflected light quantity signal obtained by splitting, from steady light, a reflected portion of the distance measurement light projected onto said object;

first distance measuring means for determining the distance to said object based on the reflected light quantity signal output by said light quantity signal output means;

second distance measuring means for receiving images of said object using a pair of sensor arrays, and for determining the distance to said object based on a phase difference between a pair of luminance pattern signals output by said pair of sensor arrays; and control means for selectively controlling said first and second distance measuring means based on the reflected light quantity signal output by said light quantity signal output means when said light-projecting means projects the distance measurement light, thereby detecting the distance to said object;

wherein said light-projecting means comprises a plurality of light-emitting elements for projecting the distance measurement light in a plurality of directions.

10. An apparatus according to claim 9, wherein said control means calculates a distance to said object in a projection direction of one of said light emitting elements which corresponds to a maximum value of the reflected light quantity signal using the pair of luminance pattern signals of said second distance measuring means when said plurality of light-emitting elements emit light.

11. A distance measuring apparatus for measuring a distance to an object, comprising:

light-projecting means for projecting distance measurement light onto said object;

light quantity output signal means for detecting reflected light from said object attributable to the distance measurement light, wherein an intensity of the reflected light varies in accordance with the distance to the object, and for outputting a reflected light quantity signal detected by splitting, from steady light, the reflected light;

first distance measuring means for detecting the distance to said object based on the reflected light quantity signal output by said light quantity signal output means;

second distance measuring means for receiving images of said object using a pair of sensor arrays, and for detecting the distance to said object based on a phase difference between a pair of luminance pattern signals output by said pair of sensor arrays; and control means for performing distance measurement using only said second distance measuring means without causing said light-projecting means to project the distance measurement light, and for causing said light-projecting means to project the distance measurement light when the distance to said object cannot be detected using only said second distance measuring means, and for then detecting the distance to said object using one of said first and second distance measuring means responsive to said light-projecting means projecting the distance measurement light.

12. An apparatus according to claim 11, wherein, when distance detection is determined to be impossible using only said second distance measuring means without causing said light-projecting means to project the distance measurement light, said control means detects the reflected light quantity signal output by said light quantity signal output means responsive to said light-prolecting means projecting the distance measurement light, and determines the distance to said object using one of said first and second distance measuring means based on a detected result.

13. An apparatus according to claim 12, wherein said control means determines the distance to said object using said first distance measuring means when the light quantity signal is smaller than a predetermined value.

14. An apparatus according to claim 11, wherein said control means determines the distance to said object using said second distance measuring means when the light quantity signal is smaller than a predetermined value.

15. An apparatus according to claim 11, wherein said light-projecting means comprises a flash unit.

16. A distance measuring apparatus for measuring a distance to an object, comprising:

light-projecting means for projecting distance measurement light onto said object;

a light quantity output signal circuit for detecting reflected light from said object attributable to the distance measurement light, wherein an intensity of the reflected light varies in accordance with the distance to the object, and for outputting a reflected light quantity signal detected by splitting, from steady light, the reflected light;

a sensor array for receiving images of said object at two different positions, and for outputting a pair of luminance distribution signals corresponding to the images of said object; and a microprocessor capable of selectively inputting the reflected light quantity signal from said light quantity signal detecting circuit and the luminance distribution signals from said sensor array, said microprocessor first detecting the distance to said object based on a phase difference between the pair of luminance distribution signals, and when distance detection is determined to be impossible on such basis, then determining the distance based on the reflected light quantity signal.

17. A distance measuring for measuring a distance to an object, comprising:

light-projecting means for projecting distance measurement light onto said object;

a light quantity output signal circuit for detecting reflected light from said object attributable to the distance measurement light, wherein an intensity of the reflected light varies in accordance with the distance to the object, and for outputting a reflected light quantity signal detected by splitting, from steady light, the reflected light;

a sensor array for receiving images of said object at two different positions, and for outputting a pair of luminance distribution signals corresponding to the images of said object; and a microprocessor capable of selectively inputting the reflected light quantity signal from said light quantity signal detecting circuit and the luminance distribution signals from said sensor array, said microprocessor first detecting the distance to said object based on a phase difference between the pair of luminance distribution signals, and when distance detection is determined to be impossible on such basis, then determining the distance based on the reflected light quantity signal;

wherein, when it is determined based on the reflected light quantity signal that said object is at a distance shorter than a predetermined distance, said microprocessor determines the distance to said object based on the phase difference between the pair of luminance distribution signals responsive to said light-projecting means projecting the distance measurement light.

18. An apparatus according to claim 16, wherein said light-projecting element comprises a flash unit.

19. A distance measuring apparatus for measuring a distance to an object, comprising:

a light-emitting element for projecting distance measurement light onto said object;

a light-receiving element for receiving a reflected portion of the distance measurement light projected on said object, and for outputting a photoelectrically converted signal corresponding to a received light quantity, wherein an intensity of the reflected light varies in accordance with the distance to the object;

a light quantity detecting circuit for receiving the photoelectrically converted signal from said light-receiving element, and for removing a signal component corresponding to steady light to output a reflected light quantity signal;

a sensor array for receiving images of said object at two different positions, and for outputting a pair of luminance distribution signals corresponding to the images of said object; and a microprocessor for receiving the reflected light quantity signal from said light quantity detecting circuit, and the pair of luminance distribution signals from said sensor array, and for selecting one of the reflected light quantity signal and the luminance distribution signals to calculate the distance to said object based on the selected signal.

20. An apparatus according to claim 19, wherein said microprocessor determines the distance to said object based on a magnitude of the reflected light quantity received by said light-projecting element.

21. An apparatus according to claim 19, wherein said microprocessor calculates the distance to said object based on a phase difference between the pair of luminance distribution signals.

22. An apparatus according to claim 19, wherein said microprocessor detects a light-received position of the reflected light on said sensor array based on the luminance distribution signals responsive to said light-projecting element projecting the distance measurement light, and calculates the distance to said object based on the detected light-received position.

23. An apparatus according to claim 19, wherein said light-projecting element comprises one of a light-emitting diode and a flash unit.

24. A distance measuring apparatus for measuring a distance to an object, comprising:

a light-emitting element for projecting distance measurement light onto said object;

a light-receiving element for receiving a reflected portion of the distance measurement light projected on said object, and for outputting a photoelectrically converted signal corresponding to a received light quantity, wherein an intensity of the reflected light varies in accordance with the distance to the object;

a light quantity detecting circuit for receiving the photoelectrically converted signal from said light-receiving element, and for removing a signal component corresponding to steady light to output a reflected light quantity signal;

a sensor array for receiving images of said object at two different positions, and for outputting a pair of luminance distribution signals corresponding to the images of said object; and a microprocessor for receiving the reflected light quantity signal from said light quantity detecting circuit, and the pair of luminance distribution signals from said sensor array, and for selecting one of the reflected light quantity signal and the luminance distribution signals to calculate the distance to said object based on the selected signal;

wherein said light-projecting element includes a plurality of light-projecting elements for measuring distances to objects in different directions.

25. An apparatus according to claim 24, wherein said microprocessor detects a magnitude of the reflected light quantity received by said light-receiving element responsive to said plurality of light-receiving elements projecting distance measurement light, and determines a direction to perform detection with the pair of luminance distribution signals based on the detected value.

26. A distance measuring apparatus for measuring a distance to an object, comprising:

a light-emitting element for projecting distance measurement light onto said object;

a light-receiving element for receiving a reflected portion of the distance measurement light projected on said object, and for outputting a photoelectrically converted signal corresponding to a received light quantity, wherein an intensity of the reflected light varies in accordance with the distance to the object;

a light quantity detecting circuit for receiving the photoelectrically converted signal from said light-receiving element, and for removing a signal component corresponding to steady light to output a reflected light quantity signal;

a sensor array for receiving images of said object at two different positions, and for outputting a pair of luminance distribution signals corresponding to the images of said object; and a microprocessor for receiving the reflected light quantity signal from said light quantity detecting circuit, and the pair of luminance distribution signals from said sensor array, and for selecting one of the reflected light quantity signal and the luminance distribution signals to calculate the distance to said object based on the selected signal;

wherein said light-receiving element also serves as a light-receiving element with respect to a remote control unit.

27. An apparatus according to claim 19, wherein said microprocessor calculates the distance to said object based on the luminance distribution signals from said sensor array when the reflected light quantity signal is larger than a first predetermined value responsive to said light-projecting element projecting the distance measurement light.

28. An apparatus according to claim 27, wherein said microprocessor calculates the distance to said object based on a phase difference between the luminance distribution signals when the reflected light quantity signal is not more than a second predetermined value which is greater than the first predetermined value, and calculates the distance to said object based on a light-received position of the reflected light of the distance measurement light using one of the pair of luminance distribution signals responsive to said light-projecting element projecting the distance measurement light when the reflected light quantity signal is not less than the second predetermined value.

29. An apparatus according to claim 19, wherein said microprocessor first selects the pair of luminance distribution signals from said sensor array, detects the distance to said object based on a phase difference between the selected pair of luminance distribution signals, and when distance detection is determined to be impossible on such basis, then causes said light-projecting element to project the distance measurement light and determines the distance to said object based on the reflected light quantity received by said light-receiving element.

30. An apparatus according to claim 29, wherein said microprocessor determines that the distance to said object is longer than a predetermined distance when the reflected light quantity signal is smaller than a predetermined value, and detects again the pair of luminance distribution signals while projecting light from said light-projecting element when the reflected light quantity signal is larger than the predetermined value, thereby determining the distance to said object based on the pair of luminance distribution signals.

31. A distance measuring apparatus for measuring a distance to an object, comprising:

a light-emitting element for projecting distance measurement light for performing distance measurement onto said object;

a light-receiving circuit which includes a light-receiving element for receiving a reflected portion of the distance measurement light projected on said object, and which outputs a reflected light quantity signal obtained by splitting a steady light component from an output from said light-receiving element, wherein an intensity of the reflected light varies in accordance with the distance to the object;

a sensor array for receiving images of said object at two different positions, and for outputting a pair of luminance distribution signals corresponding to the images of said object; and a microprocessor for calculating the distance to said object based on the pair of luminance distribution signals output from said sensor array, and for determining whether said object to be photographed is at a distance longer than a predetermined distance based on the reflected light quantity signal output by said light-receiving circuit.

* * * * *